United States Patent [19]

Torre et al.

[11] Patent Number: 5,321,079
[45] Date of Patent: Jun. 14, 1994

[54] IMPACT RESISTANT POLYAMIDE COMPOSITIONS

[75] Inventors: Hans D. Torre, Domat/Ems; Manfred Hoppe, Chur, both of Switzerland

[73] Assignee: Ems - Inventa AG, Switzerland

[21] Appl. No.: 925,974

[22] Filed: Aug. 5, 1992

Related U.S. Application Data

[63] Continuation of Ser. No. 673,961, Mar. 22, 1991, abandoned, which is a continuation of Ser. No. 89,736, Aug. 27, 1987, abandoned.

[30] Foreign Application Priority Data

Aug. 26, 1986 [CH] Switzerland ............... 03425/86

[51] Int. Cl.$^5$ .............................................. C08L 77/06
[52] U.S. Cl. ....................................... 525/66; 525/178
[58] Field of Search .......................................... 525/66

[56] References Cited

U.S. PATENT DOCUMENTS

| | | | |
|---|---|---|---|
| 4,251,644 | 2/1981 | Joffrion | 525/64 |
| 4,264,762 | 4/1981 | Cordes et al. | 528/338 |
| 4,536,541 | 8/1985 | Latham | 525/66 |

*Primary Examiner*—Ana L. Carrillo
*Attorney, Agent, or Firm*—Bierman and Muserlian

[57] ABSTRACT

A thermoplastic polyamide comprising a copolyamide and a modified copolyolefin. The copolyamide is the reaction product of a hexamethylene diamine, which may be substituted with one or more alkyl groups, and a his (4-aminocyclohexyl) alkane which is substituted adjacent to the amino groups, and a dicarboxylic acid.

Molded bodies made therefrom have high rigidity, excellent impact resistance over a broad temperature range, low water uptake, high dimensional stability, low permeability to oxygen, and high shape retention on heating. They are particularly suitable for injection molding and extrusion, especially for the preparation of thin walled or large surface area shapes.

2 Claims, No Drawings

IMPACT RESISTANT POLYAMIDE COMPOSITIONS

PRIOR APPLICATION

This application is a continuation of U.S. patent application Ser. No. 673,961 filed Mar. 22, 1991 now abandoned which is a continuation application of U.S. patent application Ser. No. 089,736 filed Aug. 27, 1987, now abandoned.

FIELD OF THE INVENTION

The invention relates to thermoplastic moldable, impact resistant polyamide compositions comprising copolyamides. It relates, in particular, to low-viscosity materials which are readily processed in injection molding or extrusion apparatus.

BACKGROUND OF THE INVENTION

U.S. No. 2,696,482 describes an amorphous polyamide derived from bis(4-aminocyclohexyl)methane and isophthalic acid, which is unsuitable for processing in, for example, injection molding because its viscosity is too high.

German 1,795,464 discloses a process for the preparation of amorphous copolyamides from combinations of alkyl-substituted hexamethylenediamines, isophthalic acid and terephthalic acid. These products also have viscosities so high that they are difficult to work.

U.S. No. 3,597,400 describes an amorphous copolyamide derived from bis (4-aminocyclohexyl)methane, hexamethylenediamines, isophthalic acid and terephthalic acid, in which the compositions having high proportions of bis(4-aminocyclohexyl)methane clearly exhibit high melt viscosities and therefore lend themselves poorly to processing, e.g. by injection molding; however, even at low diamine concentrations, viscosities are still sufficiently high that the preparation of large molded parts is difficult.

According to U.S. No. 4,369,305, viscosities below 30,000 poise at 280° C. and a shear value of $10^5$ dyn/cm$^2$ are obtained if a copolyamide composition contains particular proportions of iso- and terephthalic acids, very low proportions of bis(4-aminocyclohexyl)methane in a particular mixture of isomers; viz. at least 59% by weight trans/trans or cis/trans isomers.

U.S. No. 4,536,541 describes an amorphous copolyamide which also includes a small amount of bis(4-aminocyclohexyl)methane isomers and is modified for impact-resistance with a particular ethylene/propylene/diene copolymer (EPDM) activated with succinic acid.

It is known that, if impact-resistant modifiers of this type are worked into polyamides, they considerably increase the melt viscosity (U.S. No. 4,174,538 and German 1,242,606), so that the processing of such polyamides is again made more difficult. By contrast, a reduction of the amount of bis(4-aminocyclohexyl)methane in the amorphous copolyamide has the effect of reducing the retention of form on heating and deteriorates certain mechanical properties; e.g. viscosity and strength.

British 998,439 describes the introduction of modified polyolefins and polyacrylates into linear partially crystalline polyamides to modify impact-resistance. Impact resistance modification using particular reactive copolyolefins is described in detail in German DE-A-2,722,270 for the polyamides PA 6 and PA 66. However, partially-crystalline polyamides have a very low melt viscosity, the increase in viscosity due to the modification causes no problem in processing thermoplastic compositions of this type.

U.S. No. 4,339,555 describes the modification of conventional homopolyamides with particular copolyolefins which contain, in addition, urea derivatives for the improvement of the melt and forming processes.

British 2,170,209 discloses a transparent copolyamide derived from a dicarboxylic acid such as isophthalic acid and a diamine component comprising bis(4-amino-3,5-diethylcyclohexyl)methane as well as other polyamide-forming components. British Patent Application 86 29928 discloses a similar product, but one in which the principal diamine is bis(4-amino-3-ethyl-5-methylcyclohexyl) methane.

OBJECT OF THE INVENTION

It is an object of the invention to overcome the foregoing disadvantages for polyamide and copolyamide composition, and to provide particular readily-workable, low viscosity alloys having good properties in use.

SUMMARY OF THE INVENTION

The present invention comprises the provision of a thermoplastic polyamide which is 20 to 98% by weight of an amorphous copolyamide and 2 to 80% by weight of a modified polyolefin. The polyamide is derived from (1) one or more hexamethylene aliamines which may be substituted with at least one alkyl group; (2) at least one cyclic diamine of the formula

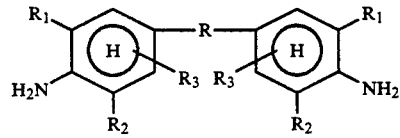

wherein R is an alkylene group having 1 to 4 carbon atoms; $R_1$, $R_2$, and $R_3$ are individually hydrogen or a substituent, except that $R_1$ and $R_2$, are not both hydrogen; and (3) at least one dicarboxylic acid.

DETAILED DESCRIPTION OF THE INVENTION

It has been found that a particular combination of compounds and substituents will produce molding compositions having surprisingly superior characteristics. In particular the use of hexamethylene diamine and isophthalic acid or an aliphatic dicarboxylic acid is satisfactory. In the case of isophthalic acid, terephthalic acid may also be included. The additional amine component is a bis(4-aminocyclohexyl) methane which has been substituted in the 3 and/or 5 positions. It is believed that the amino groups of the cyclic diamines are sterically influenced by the presence of the substituents. Therefore, by selecting a suitable mixture of isomers, it is possible to regulate the viscosity of the ultimate copolyamide.

Moreover, the combination of the foregoing copolyamides with copolyolefins further enhances the final product. In particular, ethylene/propylene and/or ethylene/1-butene copolymers provide easily worked, impact resistant compositions. These materials, due to their readily controlled viscosities, permit the injection molding of bodies having large surface areas and also enable the extrusion of extremely thin walled articles.

Cycloaliphatic amines which are useful in the present invention include
bis (4-amino-3-methyl-5-ethylcyclohexyl-methane,
bis (4-amino-3,5 -diethylcyclohexyl) methane,
bis (4-amino-3-methyl-5-isopropylcyclohexyl)methane,
bis (4-amino-3,5 -diisopropylcyclohexyl) methane,
bis (4-amino - 3,5 -dimethylcyclohexyl ) methane,
bis (4-amino -3 -methylcyclohexyl) methane,
bis (4-amino -3-ethylcyclohexyl ) methane, and
b is (4 -amino -3 - isopropylcyclohexyl) methane.

Other cycloaliphatic diamines may be used which are essentially variants of those set forth above. For example, there may be additional alkyl substituents on the cyclohexane rings or the CH$_2$ group between the rings may be placed by an alkylene chain having 2 to 4 carbon atoms. In particular, ethylene, propylene, isopropylene, or butylene, is suitable. It is preferable that the alkyl groups on the rings have 1 to 8 carbon atoms. More preferably, they should have 1 to 4 carbon atoms and, most preferably, 1 to 3 carbon atoms. It has been found particularly advantageous if the alkyl groups on the rings are a combination of methyl with ethyl or isopropyl groups. Of course, mixtures of aliamines may also be used.

The presence of the cyclodiamines not only reduces the viscosity of the copolyamide and its blend, but also provides a number of additional advantages. It has been found that the ability of the molded product to retain its shape under heating has been greatly increased. The novel compositions provide increased stiffness, in-the conditioned state as well; furthermore, improved cold impact resistance and reduced water uptake are also achieved. In addition, the molded shapes exhibit much higher heat distortion temperatures (resulting from higher glass transition temperatures) and especially low permeability to oxygen.

The content of the cyclic diamines is varied to obtain the desired viscosity, but should be at least 2% by weight, based on the total diamine content. Increasing amounts of terephthalic acid will also increase the viscosity of the polymer. Therefore, terephthalic acid should not constitute more than 10% of the total dicarboxylic acid present.

The copolyolefins which produce the improved impact resistance preferably comprise ethylene with an ethylenically unsaturated α olefin having 3 to 16 carbon atoms. Particularly preferable are ethylene 1-butene and/or ethylene/propylene which have been grafted with 0.05 to 1.0% by weight ethylenically unsaturated dicarboxylic acid or anhydride. Maleic acid or anhydride has been found especially suitable for use in connection with the present invention. The copolyolefin is used in an amount of 2 to 80% by weight of the total thermoplastic polyamide.

The compositions of the present invention may also contain the usual additives such as fillers, reinforcing agents, pigments, dyes, heat stabilizers, anti-oxidants, UV protective agents, plasticizers, and/or nucleation agents. They can also be blended or reacted with other polymers in ways known to the person of ordinary skill.

The polyamides of the present invention are particularly-suitable for processing in extrusion and injection molding machines, especially for the preparation of shapes having large surface areas or large volumes. Vehicle bodies, machine covers, and protective parts, are examples of such shapes. The compositions can also be used for the preparation of dimensionally stable components, wire and lightwave guide claddings, and thin-walled shapes having small cross-sections.

Following Examples 1 to 5 illustrate the present invention. Examples 6 to 9 show the use of unsubstituted bis(4-aminocyclohexyl) methane. As can be seen therefrom, failure to use the substituted cyclohexyl compounds of the present invention results in extremely high and uncontrollable melt viscosities. As a result, it is virtually impossible to injection mold such materials.

Solution viscosities were measured as a 0.5% w/v solution in m/cresol, melt viscosities were measured at 270° C./122.6N. Tg is the glass transition temperature.

EXAMPLE 1

376.5 g isophthalic acid (47.7 mol %), 395.5 g of a 60% aqueous hexamethylenediamine solution (43.0 mol %), 118.0 g his (4-amino-3,5-diethylcyclohexyl)methane (7.8 tool %), and 8.7 g benzoic acid (1.5 tool %) were charged into a reaction vessel at 180° C. and then heated for 1 hour at 250° C., with stirring, under a nitrogen blanket. The water of reaction (c. 182.0 ml) obtained in the polycondensation was separated and collected, and the temperature was then maintained at 285° C. for about 4.5 hours. The resultant polymer was completely transparent, had a solution viscosity of 1,529 and a melt viscosity of 912 Pa. 's. Tg was 138° C.

The polymer thus prepared was mixed with 20% by weight of an ethylene/propylene-ethylene/1-butene copolymer mixture grafted with maleic acid anhydride and extruded in a laboratory extruder (type Netstal 5730/N 110), at a mass temperature of about 260° C. The polymer strand was cooled in water, granulated, and dried. Tg was then 138° C. and the melt viscosity was 1342 Pa.'s (of 270° C./122.6N).

EXAMPLE 2

357.3 g isophthalic acid (42.6 tool %), 15.0 mg benzoic acid (2.4 tool %), 40.0 g terephthalic acid (4.8 tool %), 102.0 g bis(4-amino-3-methyl-5-ethylcyclohexyl)-methane (6.9 tool %) and 254.0g hexamethylenedtamine (43.3 mol %) were introduced into a reaction vessel and gradually heated to 180° C. with stirring under a nitrogen blanket. After separating the water of reaction, the reaction mixture was heated to 285° C. for 3 hours and cooled. The glass clear polycondensation product had a solution viscosity ηrel=1.628 and a melt viscosity of 1212 Pa. 's. Tg was 152° C. After co-extrusion with 20% by weight of the modified copolyolefin mixture described in Example 1, the viscosity rose to 1520 Pa. 's, Tg was still 152° C. A test body prepared therefrom had a water uptake of only 2.1% after storage in water at 25° C. for 3 months.

EXAMPLE 3

273.0 g isophthalic acid (39- 9 tool %), 85.0 g. dodecanedicarboxylic acid (8.9 tool %), 125.0 g hexamethylenediamine (26.1 tool %), and 333.0 g his (4-amino-3,5-diethylcyclohexyl)methane (25.1 tool %) were polycondensed at 285° C. The relative solution viscosity of the transparent polycondensate was 1.504, the melt viscosity was 680 Pa. 's, and Tg was 165° C.

After extrusion with 20% by weight of an ethylene/-propylene/1-butene polyolefin mixture grafted with maleic acid anhydride, the viscosity of the composition was 836 Pa.'s, and Tg was 159° C.

EXAMPLE 4

21.3 kg isophthalic acid (42.42 mol %), 3.4 terephthalic acid (6.86 mol %), 26.15 kg of a 60.4% aqueous hexamethylenediamine solution (45 tool %), 3.58 kg bis(4-amino-3-methylcyclohexyl)methane (4.97 tool %), 400 g stearic acid (0.74 mol %), and 5 liters water were heated in a 150 liter autoclave with stirring to 260° C. After releasing pressure in the autoclave, the contents were polycondensed under nitrogen at 290° C., the polycondensate was taken off as a strand through a water bath, and granulated. The glass-clear granulate had a solution viscosity of 1,589, a melt viscosity of 1158 Pa. 's and Tg of 143° C.

Test bodies prepared therefrom exhibited an impact resistance according to DIN 53453 of no break, and a notch toughness of 1.9 kJ/m$^2$. The bending E modulus according to DIN 53452 was 2754 N/mm$^2$ and the limit bending stress was 153 N/mm$^2$. The water uptake was 29% after 30 days storage in water at 25° C. The amorphous copolyamide was mixed with 20% by weight of the copolyolefin mixture given in Example 3, extruded and comminuted. The melt viscosity Of the granulate was 1410 Pa.'s and Tg was 142° C.

Test bodies prepared from the granulate exhibited an impact resistance of no break according to DIN 53453 and a notch toughness of 44.0 kJ/m$^2$ at 22° C. and 16 kJ/m$^2$ at −40° C., additionally a bending E modulus of 1911 N/ram$^2$ (dry) and 1903 N/mm$^2$ (conditioned) according to DIN 43457 and a breaking strength (dry) of 58.7 N/mm$^2$ and an elongation at break of 150%.

The water uptake was only 2.5% after 30 days storage in water at 25° C.

EXAMPLE 5

2.8 kg isophthalic acid (41.1 mol %), 0.52 kg terephthalic acid (7.4 mol %), 2.07 kg hexamethylenediamine (43.4 mol %), 0.83 kg (7.1 mol %) bis(4-amino-3,5-diethylcyclohexyl)methane, and 50 g (1 mol %) benzotc acid were polycondensed in a 20 liter autoclave at 285° C. The resultant polycondensate had a solution viscosity of 1.574, a melt viscosity of 840 Pa. 's and Tg of 140° C.

Test bodies prepared therefrom exhibited an impact resistance of no break and a notch toughness of 2.3 kJ/m$^2$(DIN 53453), as well as a bending E modulus of 3080 N/mm$^2$(dry) and of 2334 N/mm$^2$ (conditioned) according to DIN 53457.

After compounding with 12% by weight of the copolyolefin mixture described in Examples 3 and 4, test bodies prepared from the composition were measured to have an impact resistance of no break, a notch toughness at 23° C. of 30.5 kJ/m$^2$ (dry) and at −40° C. of 12 kJ/m$^2$ a bending E modulus of 2360 M/ram$^2$ (dry) and 2400 N/mm$^2$ (conditioned), and a limiting bending stress of 100 N/mm$^2$.

EXAMPLE 6 (Comparative),

Bis(4-aminocyclohexyl)methane having an isomeric distribution of 36% by weight trans/trans, 45% by weight cis/trans and 9% by weight cis/cis was used. 15.0 kg isophthalic acid (44.14 mol %), 1.60 kg terephthalic acid (4.7 mol %), 10.3 kg hexamethylenediamine (43.3 tool %), 3 kg bis (4-aminocyclohexyl) methane (6.97 tool %), and 0.22 kg benzoic acid (0.89 mol %) were polycondensed in a 20 liter autoclave at 280° C.

The copolyamide was drawn off as a transparent strand and granulated. It had a solution viscosity of 1.539 and a high melt viscosity of 2974 Pa. 's. After co-extrusion with 20% by weight of the modified copolyolefin mixture described in Example 3, the viscosity rose to 5200 Pa.'s. At this melt viscosity value, test bodies could not be prepared without problems, and only with great difficulty.

The physical characteristics of the copolyamide were as follows:

| Without modifier | |
| --- | --- |
| Tg | 135° C. |
| Flexural Strength | 165 N/mm$^2$ |
| Impact Resistance | 60% no break |
| | 40% 53 kJ/m$^2$ |
| Notched Impact Resistance | 1.6 kJ/m$^2$ |
| Bending E Modulus | 3100 N/mm$^2$ |
| Tensile Strength at break | 50% 102 N/mm$^2$ |
| | 50% 70 N/mm$^2$ |
| With Modifier | |
| Tg | 130° C. |
| Flexural Strength | 95 N/mm$^2$ |
| Impact Resistance | no break |
| Notched Impact Resistance | 45.9 kJ/m$^2$ |
| Bending E Modulus | 2140 N/mm$^2$ |
| Tensile Strength at break | 57 N/mm$^2$ |

EXAMPLE 7 (Comparative)

Bis(4-aminocyclohexyl)methane having an isomeric distribution of 54% by weight trans/trans, 40% by weight cis/trans and 6% by weight cis/cis was used. 2.98 kg isophthalic acid (44.0 tool %), 0.341 kg (5 tool %) terephthalic acid (5.0 tool %), 2.07 kg hexamethylenediamine (43.7 tool %), 0.55 kg (6.5 tool %) his (4-aminocyclohexyl) methane, and 40 g benzoic acid (0.8 mol %) were polycondensed in a 20 liter autoclave to give a transparent copolyamide.

The viscosity rose extremely quickly and the autoclave could only be emptied with difficulty. The relative solution viscosity was 1.68 and the melt viscosity 7640 Pa. 's.

After extrusion with 20% by weight of the copolyolefin mixture described in Example 3, a highly viscous polymer composition was obtained, whose melt viscosity was greater than 10,000 Pa.'s. No injection molded bodies could be prepared, because they could not fill the mold.

EXAMPLE 8 (Comparative)

The procedure of Example 5 was followed except that the following were used:
2.905 kg (35 tool %) Isophthalic Acid
1.240 kg (15 tool %) Terephthalic Acid
2,800 kg (48 mol %) Hexamethylene diamine
0,220 kg (2 tool %) bis (4-amino cyclohexyl)methane
0.005 kg (0.03 mol %) stearic acid
280° C. reaction temperature Solution viscosity was 1.512, melt viscosity was 3240 Pa. 's (at 270° C./122.6N), and Tg was 126° C. No test bodies could be produced, nor could the material be compounded because of viscosity increase.

EXAMPLE 9 (Comparative)

The procedure of Example 8 was followed except that the following were used:
4,780 kg (42 tool %) IPA
0,910 kg (8 mol %) TPA
3.600 kg (45 tool %) HMD 0,720 kg ( 5 tool %) bis(4-aminocyclohexyl)-methane
0.030 kg (. 15 tool %) stearic acid Solution viscosity was 1.47, melt viscosity was 2900 Pa.'s (at 270/122.6N), and Tg was 133° C. No test bodies could be produced, nor could the material be compounded because of viscosity increase.

Although only a limited number of specific embodiments of the present invention have been expressly disclosed, it is, nonetheless, to be broadly construed and not to be limited except by the character of the claims appended hereto.

We claim:

1. A thermoplastic polyamide composition having a melt viscosity of 836 to 1520 Pa is measured at 270°/122,6N and a $T_g$ of 138 to 159° C. comprising
   A. 20 to 98% by weight of an amorphous copolyamide derived from
      a. 42.2 to 45.03 mol % of at lest one member of the group consisting of hexamethylene diamine and hexamethylene diamine substituted with at least one alkyl group;
      b. 4.97 to 7.8 mol % of at least one cyclic diamine of the formula

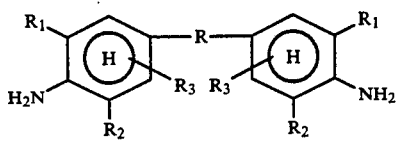

wherein R is an alkylene group of 1 to 4 carbon atoms; $R_1$ and $R_2$ and $R_3$, which may be the same of different, are hydrogen or alkyl of 1 to 8 carbon atoms, except that $R_1$ and $R_2$ are not both hydrogen; and
      c. substantially equimolar with the total of said hexamethylene diamine and said cyclic diamine of isophthalic acid or isophthalic acid with up to 10% by weight of terephthalic acid based on the total dicarboxylic acid, and
   B. 2 to 80% by weight of a copolymer or ethylene and at least one ethylenically unsaturated olefin of 3 to 16 carbon atoms grafted with an ethylenically unsaturated dicarboxylic acid or an anhydride thereof.

2. A polyamide composition of claim 1 wherein R is methylene, $R_1$ is hydrogen and $R_2$ is methyl.

* * * * *